(12) United States Patent
O'Connell, Jr.

(10) Patent No.: US 7,720,905 B1
(45) Date of Patent: May 18, 2010

(54) METHOD AND SYSTEM FOR AUTOMATED DIGITAL ASSET MANAGEMENT ON CLIENT-SERVER COMPUTER NETWORK

(75) Inventor: Conleth S. O'Connell, Jr., Austin, TX (US)

(73) Assignee: Vignette Software LLC, Austin, TX (US)

( * ) Notice: Subject to any disclaimer, the term of this patent is extended or adjusted under 35 U.S.C. 154(b) by 1819 days.

(21) Appl. No.: 10/745,359

(22) Filed: Dec. 23, 2003

(51) Int. Cl.
   *G06F 15/16* (2006.01)
(52) U.S. Cl. ............... 709/202; 709/201; 709/203; 709/218; 709/219; 719/328
(58) Field of Classification Search ............ 709/218, 709/219, 201–203; 719/328
   See application file for complete search history.

(56) References Cited

U.S. PATENT DOCUMENTS

| | | | |
|---|---|---|---|
| 6,647,396 | B2 | 11/2003 | Parnell et al. |
| 6,662,312 | B1* | 12/2003 | Keller et al. ............... 714/38 |
| 7,076,496 | B1* | 7/2006 | Ruizandrade ............ 707/102 |
| 7,349,942 | B1* | 3/2008 | O'Connell et al. ........ 709/203 |
| 2003/0005166 | A1* | 1/2003 | Seidman ................... 709/310 |
| 2003/0005406 | A1 | 1/2003 | Lin et al. |
| 2003/0023662 | A1 | 1/2003 | Yaung |
| 2003/0098879 | A1* | 5/2003 | Mathews ................... 345/762 |
| 2004/0261053 | A1* | 12/2004 | Dougherty et al. ......... 717/101 |
| 2007/0100903 | A1* | 5/2007 | Cherry ...................... 707/201 |
| 2008/0162502 | A1* | 7/2008 | Klein et al. ............... 707/100 |
| 2009/0037883 | A1* | 2/2009 | Garbers et al. ............ 717/125 |

FOREIGN PATENT DOCUMENTS

WO    WO 02/27510 A1    4/2002

OTHER PUBLICATIONS

Hollingsworth, David, "Workflow Management Coalition the Workflow Reference Model", 55 pages, 1995, Jan. 19, 1995.

* cited by examiner

*Primary Examiner*—Nathan Flynn
*Assistant Examiner*—Mohamed Wasel
(74) *Attorney, Agent, or Firm*—Sprinkle IP Law Group

(57) ABSTRACT

A method and system can be used to automatically manage a digital asset, from development to deployment, to control change within a network environment in a comprehensive and efficient manner. Digital assets can be tracked for progress and inaccuracies, mistakes, and incompatibilities can be addressed prior to deployment. Stages can be used to formalize and automate the flow of digital assets along the process. Further, metadata regarding the digital asset can be captured at any time to provide an audit trail for the digital asset from development all the way through deployment. Any stage may have access to any or all metadata captured for the digital asset.

23 Claims, 3 Drawing Sheets

METHOD AND SYSTEM FOR AUTOMATED DIGITAL ASSET MANAGEMENT ON CLIENT-SERVER COMPUTER NETWORK

FIELD OF THE INVENTION

This invention relates in general to management of digital assets, and more particularly, to automatically managing the staging of digital assets.

DESCRIPTION OF THE RELATED ART

Development, testing, and deployment of applications and content on a client-server computer network, such as the Internet, can be done with or without any testing or authorization. Put in other terms, a network site can allow changes to be made without any checks (risky) or implement a cumbersome, tedious, localized, manual, inefficient process. The first alternative is clearly unacceptable. The rest of this section focuses on the latter alternative.

In an effort to reduce risk, many business or other organizations have developed manual systems to isolate and control change in their application and content environments for their network sites. After content or applications are developed, they can be tested, reviewed (e.g., edited), and approved. After all tests are successful, reviews are completed, and approvals are obtained, the content or applications can be deployed. Unfortunately, the tests, reviews, and approvals make this a cumbersome, tedious, localized, manual, inefficient process. A content developer or another individual may bypass some or all of the tests, reviews, approvals, etc., because there are typically no audit trails or other measures to prevent bypassing of the tests, reviews, and approvals.

Existing methods for managing the development, testing, and deployment of new content and applications may provide only a localized manner for one group or department, working in isolation from the rest of the organization, to develop, test, and then hopefully deploy their content or application. One problem with this method is that other departments or groups within the organization generally do not have ready access to the content or application in the various phases from development to deployment.

Along similar lines, those methods are typically implemented in a segmented manner and may force testing or other tasks to be performed on the application or content by other separate, localized groups. After one group is finished with its portion of the testing or other work, that group's involvement may completely stop and then the group provides the content or application to the next group without a means of tracking changes or providing other groups' inputs during the time that the current group had access to the content or application.

Even further, existing methods may use physical machines that are not configured to interact efficiently with one another. No "fluid" transfers of the content or application between groups. Effectively, the transfers are "manual hand-offs" between groups. Systems are typically not configured for easy interoperability, which leads to delays, increased costs, and potential for lost or corrupted content and applications when transferring the content or application from one physical environment to another.

A developer may (1) become frustrated with the time that the tests, reviews, and approvals take, (2) believe some or all the tests, reviews, and approvals are excessive or unnecessary, or (3) believe that he or she or his or her group is being treated differently compared to other individuals or groups. Because there is typically no audit trail, the developer may become inclined to bypass some or all of the tests, reviews, and approvals and deploy the application or content prematurely. Neither the "instantaneous" developer deployment nor the long, manual process is acceptable.

SUMMARY OF THE INVENTION

A method and system can be used to automatically manage a digital asset over its lifetime to control change within a network environment in a comprehensive and efficient manner. A digital asset can be automatically moved through an operational process that is physical or logical in nature according to how an enterprise isolates repositories. Digital assets can be tracked for progress; and inaccuracies, mistakes, and incompatibilities can be addressed prior to deployment. Stages can be used to formalize and automate the flow of digital assets along the process. Further, metadata regarding the digital asset can be captured at any time to provide an audit trail for the digital asset from development all the way through deployment. The metadata can include not only the change records for the digital asset but may also include other information, such as results from staging and where the digital asset has been deployed. Any stage may have access to any or all metadata captured for the digital asset.

In one set of embodiments, a method of managing a digital asset can comprises processing a digital asset at a first stage. The method can also comprise automatically forwarding the digital asset from the first stage to a second stage.

In another set of embodiments, a data processing system readable medium comprising code embodied in a data processing system readable medium. The code can comprise an instruction for processing a digital asset at a first stage. The code can also comprise an instruction for automatically forwarding the digital asset from the first stage to a second stage.

In a further set of embodiments, a system for deploying a digital asset can comprise a management hub to manage the digital asset. The system can also comprise a delivery system to deploy the digital asset. The delivery system may be controlled by the management hub. The system can further comprise a command center coupled to the management hub.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

Figure 1:
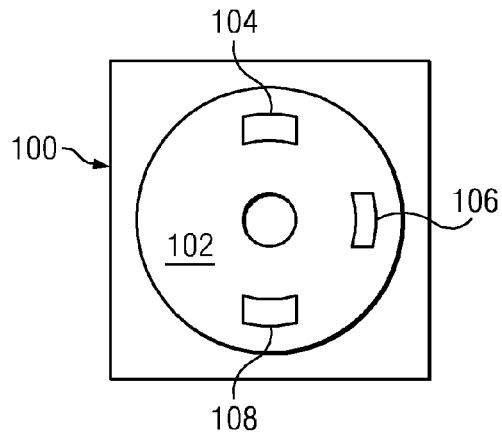
FIG. 1 includes an illustration of a data processing system storage medium including software code having instructions in accordance with an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

The change management process, for which information technology ("IT") team has responsibility, is difficult. A large part of managing change is improving how the enterprise executes. The idea is to use the web and enable an enterprise to allow customers to service themselves. The method and system can allow customers of the enterprise to have access to traditionally internal-based systems of the enterprise. Within the enterprise, an operational aspect may be changed to expose an application where the enterprise desires in implementing the method and system. The operations can be formalized into stages, automatic routing between stages can be used, and metadata can be captured to make it easier for the IT department to manage changes to digital assets along the way. A management hub may have access to any or all information about the digital asset, including the captured metadata. The business user or customer of the enterprise can be empowered to perform at least some tasks without intervention by the IT department. The manual process of going through a call center, a help desk, or other human intervention can be substantially eliminated or at least reduced.

The method and system can comprise an automated way of transferring a digital asset from initial creation through deployment, and potentially beyond. Methods can be used to automatically manage a digital asset, from development to deployment, to control change within a network environment in a comprehensive and efficient manner. In this way, digital assets can be tracked and inaccuracies, mistakes, and incompatibilities can be addressed prior to deployment.

The method and system can be obtained by formalizing operations and capturing metadata at every point during the life cycle of the digital asset. Metadata regarding the digital asset can be captured at any time to provide an audit trail for the digital asset from development all the way through deployment and disposition. The metadata can include not only the change records for the digital asset but may also include other information, such as results from staging and where the digital asset has been deployed.

A digital asset can be automatically moved through an operational process that is physical or logical in nature according to how an enterprise isolates repositories. Notifications can be made automatically to a stage when a digital asset is received by that stage. Any or all of the metadata captured may be accessible by any stage or a command center. The method and system can be used to generate a view of the digital asset to track the digital asset and its corresponding metadata.

More specifically, the method and system allows development of digital assets to be isolated from production of the digital assets. The isolation allows change to be better controlled. Testing and other stages, if any, may also be isolated from one another and from the development and production stages. The core pieces of this system using a recursive model comprise a management hub system (typically in the form of a management stage and its management console), a deployment stage or subsystem that encapsulates where digital assets are going to go, and a configuration console and its repository of configuration and other information (i.e., metadata regarding the digital assets). The configuration console can be used to provide a global view of the enterprise and environments that are being managed and using digital assets. With the configuration console, an enterprise can view its Internet in terms of where different digital assets are located and going and what information has been captured regarding the digital assets during its life cycle. Prior conventional systems do not have such capability. The management console can provide an interface to the management stage in a way that humans can manipulate, such as defining business rules to which the management stage needs to comply.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider.

The term "agent" is intended to mean a software component used to activate a piece of hardware or software or perform an operation on a file. Examples of agents include deployment agents, which can be used to allow for the deployment of a digital asset within an internal network, and configuration agents, which can include instructions to configure hardware or a different software component. Other agents may be used within the system.

The term "deployment" is intended to mean promoting, migrating or disposing digital assets or references to digital assets from one stage to another stage.

The term "digital asset" is intended to mean information in a digital or electronic form. Digital asset should be broadly construed and includes data and its metadata from a database, time of day from a computer's clock, a software component (e.g., a software product, revision, update, etc.), a customer profile, a workflow, metadata regarding a physical object (e.g., a stock keeping unit that refers to a physical product of a company), a file, a software component, or the like.

The term "metadata" is intended to mean information regarding other information and should be construed broadly. For a digital asset, its metadata may include a location where the digital asset is located, test results from using the digital asset, revision history for the digital asset, state information of environments on which the digital asset is used, or the like.

The term "production" is intended to mean a digital asset approved for distribution to a targeted audience. A digital asset may be approved for one running environment, such as Apple Safari™ with a MacOS™ operating system, but not another environment, such as Microsoft Internet Explorer™ with a Windows XP™ operating system. Therefore, the digital asset is in production for the Apple system but not the Microsoft system.

The term "software component" is intended to mean at least a portion of a computer program (i.e., a software application). Examples include a developer's software component, a management console software component, a staging software component, a delivery software component, an agent, or the like. Different software components may reside in the same computer program or in different computer programs on the same computer or different computers.

The term "stage" is intended to mean a logical definition of resources (hardware, software, and people) corresponding to an operation having an expectation that it is providing to an enterprise. Stages can include a software development stage, a management stage, a quality assurance stage, a production stage, and potentially other stages. A stage may be geographically localized or spread out over a large geographic area. Stages may also be called phases, steps, environment levels (e.g. E5, E6, etc.), or the like.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In the figures, lines and arrows between boxes or other objects denote that the boxes or other objects are coupled to each other. Doubled headed arrows are used to illustrate bi-directional coupling, and single headed arrows are used to illustrate unidirectional coupling. Unless stated otherwise, unidirectionally coupled boxes and other objects may be replaced with bi-directional coupling. Although many items are shown as being bidirectionally coupled, the flow of information or signals may be more prevalent in one direction compared to the other.

The method and system may be implemented on any one or more computers. When more than one computer is used, the computers may be bi-directionally coupled to an internal network (e.g., within an enterprise), an external network (e.g., the Internet), or any combination of internal and external networks. The computers may have a client-server, server-server, peer-to-peer or other relationship. Some exemplary architectures for using the method and system are described later in this specification. Many configurations are possible and known to skilled artisans.

Each computer can include a central processing unit ("CPU"), a read-only memory ("ROM"), a random access memory ("RAM"), a hard drive ("HD") or storage memory, and input/output device(s) ("I/O"). The I/O can include a keyboard, monitor, printer, electronic pointing device (e.g., mouse, trackball, stylus, etc.), or the like. Each of the computers in FIG. 1 may have more than one CPU, ROM, RAM, HD, I/O, or other hardware components. For simplicity, each computer is illustrated as having one of each of the hardware components, even if more than one is used.

Each of the computers is an example of a data processing system. ROM, RAM, HD, and databases can include media that can be read by the CPU of a computer. Therefore, each of these types of memories includes a data processing system readable medium. These memories may be internal or external to the computers.

The methods described herein may be implemented in suitable software code that may reside within ROM, RAM, or HD. The instructions in an embodiment of the present invention may be contained on a data storage device, such as HD 100. FIG. 1 illustrates a combination of software code elements 104, 106, and 108 that are embodied within a data processing system readable medium 102, on HD 100. Alternatively, the instructions may be stored as software code elements on a DASD array, magnetic tape, floppy diskette, optical storage device, or other appropriate data processing system readable medium or storage device.

Figure 2:
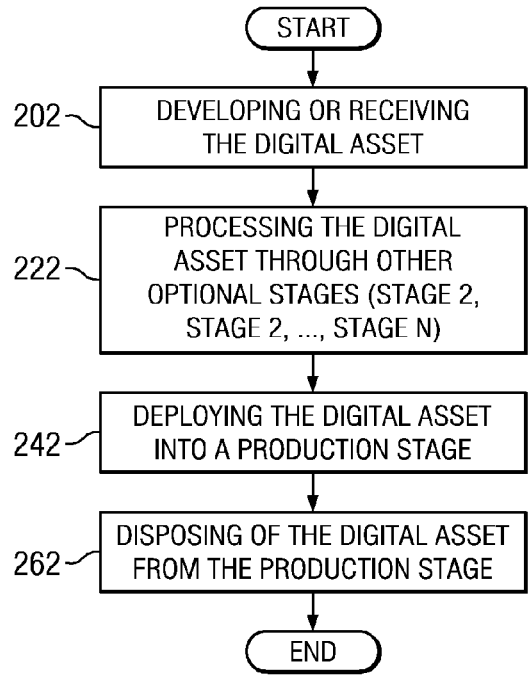
FIG. 2 includes a process flow diagram for managing the deployment of a digital asset in accordance with an embodiment of the present invention.

In an illustrative embodiment of the invention, the computer-executable instructions may be lines of assembly code, compiled C++, Java, or other language code. The functions of any one of the computers may be performed by a different computer. Additionally, a computer program or its software components with such code may be embodied in more than one data processing system readable media in more than one computer. FIG. 2 includes an illustration, in the form of a flowchart, of the structures and operations of such software program(s).

The various software components for performing the methods described herein may be on separate computers. In alternative embodiments, some or all of the software components may reside on the same computer.

Communications between any of the computers can be accomplished using electronic, optical, radio-frequency, or other signals. For example, when a user is at a computer, the computer may convert the signals to a human understandable form when sending a communication to the user and may convert input from a human to appropriate electronic, optical, radio-frequency, or other signals to be used by that computer or other computers.

Attention is now directed to a new method and system for managing change using enterprise web applications. FIG. 2 illustrates a flow diagram of an exemplary method. The method can comprise developing or receiving a digital asset (block 202), processing the digital asset through other optional stages (block 222), deploying the digital asset into a production stage (block 242), and disposing of the digital asset from the production stage (block 262). Note that the stages typically correspond to operational units, such as a development team, a quality assurance team, and a production team. Note that nearly any number of stages may be present. The stages may be arranged so that the activities of those stages are be performed in parallel, in series, optionally (e.g., operation corresponding to stage may be performed if time permits), or any combination of them. In some embodiments, a development stage or quality assurance stage may not be present or may be optional (present but may or may not be used). The method and system can be designed to capture the actual processes used for moving the digital assets around an enterprise.

During a development stage, a software development team can develop the digital asset until development is to a point where the digital asset may be considered a release candidate. During development, the digital asset remains under the control of the management stage. The digital asset is typically in a relatively high state of flux because change may occur quickly and often. Isolating the development stage from other stages may help to prevent an unintentional release of a digital asset that has not been fully developed. Note that an enterprise may not have a development stage because the digital asset may be received from a vendor or third party.

After the software development team is finished or the digital asset is received from the vendor, the system, via the management stage, can automatically deploy the digital asset to any one or more of the other stages.

In one embodiment, a quality assurance stage may be used. The quality assurance team can use the digital asset on different machines and configurations to test the digital asset within the isolated environments of those different machines. For example, load testing may not be performed on systems having the development or production stages due to the increased possibility of a system overload.

After the quality assurance stage is finished with the digital asset, the management hub can deploy the digital asset to a production stage. An enterprise may have one or more production stages because of different criteria (communication channel (e.g., internet, intranet, extranet, etc.), geographic region, load balancing, or the like). More details regarding deployment of digital assets are described later in this specification. Throughout the digital asset's natural lifecycle, the digital asset may remain be under control of the management hub even after deployment to its final stage(s) meaning delete, archive, and purge operations.

The enterprise can have any number of stages to perform tasks that are defined by their operations. In other words, the stages can be defined and connected in a manner that may more closely match the organization of the enterprise. Each stage can correspond to an operational unit within the enterprise. For example, development, quality assurance, and production may correspond to different stages. Other stages may include a translating team, a legal team, etc. In its most compact form, as little as one stage can be used: the management stage having a production subsystem.

The enterprise can determine which stages to use as it desires and how they are connected to each other (i.e., serially, in parallel, or a combination of the two). The stages may be defined by logical divisions or physical locations or the like within an enterprise.

As the digital assets are developed, tested, deployed, etc., metadata can be captured regarding the digital assets. Part of all of the metadata may be accessible by configuration console and management stage at the current level and potentially at subordinate level (as will be described later).

Attention is now directed to more detailed descriptions of an exemplary system in accordance with an embodiment of the present invention. FIGS. 3-6 are described with respect to providing an architecture that can be for used for managing change caused by digital assets being introduced to or changed within an enterprise or deployment of digital assets to customers of the enterprise. Later in the specification, details regarding initially creating the system (i.e., the system includes the digital assets) are addressed.

Figure 3:
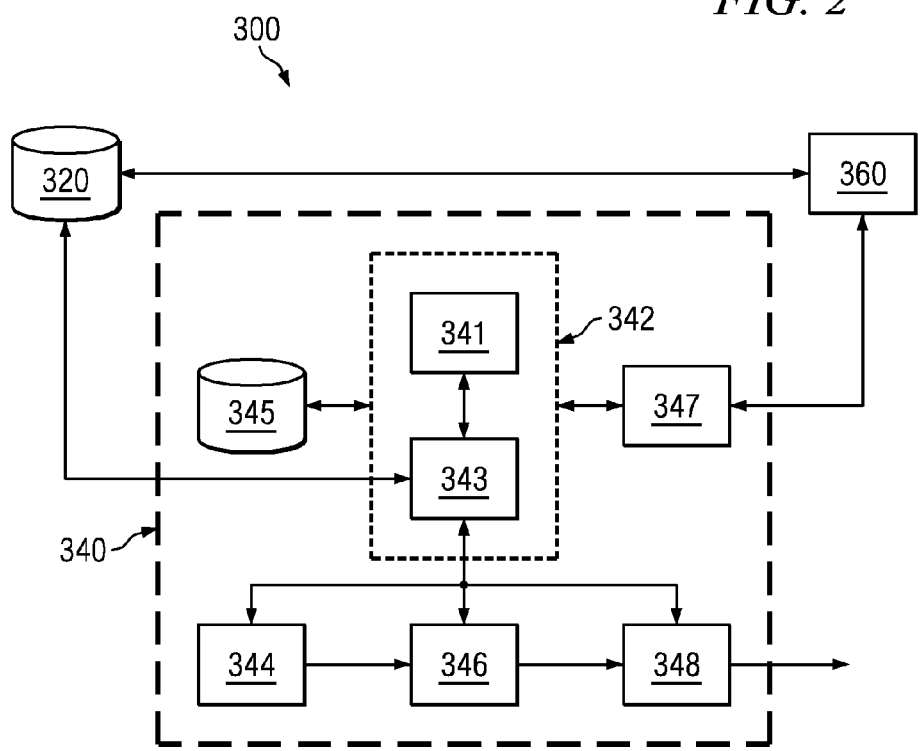
FIGS. 3-6 include system architectures that may be used in accordance with embodiments of the present invention.

FIG. 3 includes an exemplary system 300. Stage 340 includes a set of web applications and can be bi-directionally coupled to repository 320 and configuration console 360. Repository 320 may be bi-directionally coupled to configuration console 360.

As the digital assets are developed and move into and out of environments at stages, changes to the digital assets, if any, and metadata for those digital assets can be captured and stored within repository 320. Therefore, each action along the way can be logged and any changes or manipulations can be tracked. Such metadata can also include state information of environments while developing, testing, or using the digital assets. The metadata can provide an audit trail to track the progression of a digital asset from development to production, and potentially beyond.

Repository 320 may also contain other digital assets, such as databases, unstructured content (e.g., text files, image files, etc.), structured content (e.g., XML documents), integration sources (e.g., Enterprise Resource Planning ("ERP"), Customer Relationship Management ("CRM"), Supply Chain Management ("SCM"), etc.), other content repositories, and third party aggregation sources (e.g., news wire services, etc.).

Configuration console 360 can be under control of the IT department of the enterprise. Configuration console 360 can monitor the digital assets including creation, all changes to them, their status, when they were deployed, who has accepted them, environments in which they are running, or nearly any other information regarding the digital assets. Note that a management system is an example of a digital asset. Referring to FIG. 3, management hub 342 may include digital asset(s) that are currently under the control of configuration console 360. Therefore, configuration console 360 may control management hub 342 while yet another digital asset is being processed through stage 340.

A centralized point for metadata regarding the digital asset helps to manage change better and provide an easier way to obtain information about the digital asset. Each computer involved in the process can register through configuration console 360, such that nearly all information of the digital asset including stage information can be tracked and accessed from a centralized location. The view can be extended outside of an enterprise to capture and formalize the process at those locations. For example, the view can be extended to the testing and deployment of a digital asset within a customer's enterprise. Configuration console 360 may activate configuration agents that act on its behalf to automatically configure the environment for the proper use of the digital asset at stages, which are registered with configuration console 360.

In order to achieve this, the method and system can be designed to formalize of the concept of a stage and capture metadata. Configuration console 360 can allow the IT department of the enterprise to view the system. In one embodiment, the configuration console 360 can be a management system capable of managing the deployment of other management systems as digital assets.

In one embodiment, stage 340 may be used to interface using a network. Stage 340 may include management hub 342 that is bi-directionally coupled to local repository 345, local configuration console 347, development stage 344, testing stage 346, and production stage 348.

Although not shown, either or both configuration consoles 347 and 360 may be bi-directionally coupled to each of the stages within stage 340. In an alternative embodiment, repository 320 may be coupled to repository 345, and in another embodiment, repository 320 may not be coupled to management stage 343 (i.e., repository 320 can only be accessed, if at all, by stage 340 via configuration console 360).

Management hub 342 can include management console 341 and management stage 343. Management console 341 can be an interface for humans (e.g., employees of the enterprise) to provide business rules or other logic to which management stage 343 is to comply. Management stage 343 can be a software component that executes commands to make the system properly operate. In effect, it is the "brains" of the system.

Management hub 342 can manage the business processes for stages under its control, which are stages 344, 346, and 348 in this embodiment. Management hub 342 can also track the digital assets, changes to the digital assets, and metadata of the digital assets through other stages within stage 340. Digital assets may be instantiations of defined content types. The definitions for the content types may include information about managing the digital assets as they get versioned and propagated.

Management hub 342 may include remote agents and can be used to work with the different subsystems within stages 344, 346, and 348. The remote agents may be deployment agents for a deployment process. Referring to FIG. 3, the remote agents, under the control of management hub 342 can control a digital asset as it is deployed from stage 344 to 346 (illustrated with a unidirectional arrow), and from stage 346 to 348 (also illustrated with a unidirectional arrow). If a digital asset needs to go to an "upstream" stage (e.g., from stage 346 to 344), the digital asset may be routed using management hub 342. From a configuration perspective, the same treatment may be used with configuration agents, and configuration agents can make changes to have those different processes work in the environment. Configuration console 360 may be updated as the digital asset is routed through the stages and as metadata for the digital asset is being collected. In this manner, configuration console 360 can give a global view of the digital asset and its metadata.

The development of digital assets may occur within development stage 344. Testing stage 346 may be used to perform a wide variety of tasks between the initial development of the digital asset until its promotion or launch to production stage 348. Other stages may be present but are not shown for simplicity.

Production stage 348 may have access to digital assets that have been promoted. A promotion process, under the direction of management stage 342, can determine when and under what circumstances any or all promoted digital assets will be deployed to the next stage in the process. Deployment agents or configuration agents may be used during the deployment of digital assets. In one embodiment, within the enterprise, the product (digital asset at the production stage) can effectively go to customer support for the enterprise. From customer support's view, customer support receives the digital asset; they examine the digital asset and understand it. Customer support may have its own quality assurance stage. When customer support approves the digital asset as a product, then the product can go into customer support's production environment. Customer support's production environment can then send product out to any or all the different customers of the enterprise.

In one embodiment, a new version of a digital asset may be developed using the system. Development stage 344 may operate using version 2.0 of the digital asset while development stage 344 develops version 2.1. Testing stage 346 may operate using version 1.4 of the digital asset while testing version 2.0 that was deployed from development stage 342 under the control of management stage 342. Likewise, production stage 348 may operate using version 1.3 of the digital asset while testing version 1.4. After the first iteration of the software (which will be described later), management stage 342 may operate using version 2.0 of the digital asset, which the latest version that has been deployed by production stage 348.

Some of activities within stage 340 may automatically be performed and be transparent to a user at the source of digital asset (e.g., a developer) and a user at the destination of the digital asset (e.g., a customer). For example, a customer may request a CD ROM version of the digital asset from a vendor. Management hub 342 may be given instructions via management console 341 to burn and ship the CD ROM. The business rules and processes may involve accessing the digital asset and routing it to a validation stage (e.g., stage 346) under the control of management hub 342. During validation, metadata may be captured and sent to the configuration console 360 to be saved within repository 320. The digital asset may be deployed from the validation stage to production stage 348 where the digital asset is burned into the CD ROM. From the time the instruction to burn the CD ROM is given until the CD ROM has been burned, all activities may be automated and involve no human interaction. Note that the automated validation stage may reduce the likelihood that the customer receives the digital asset having an error.

Figure 4:
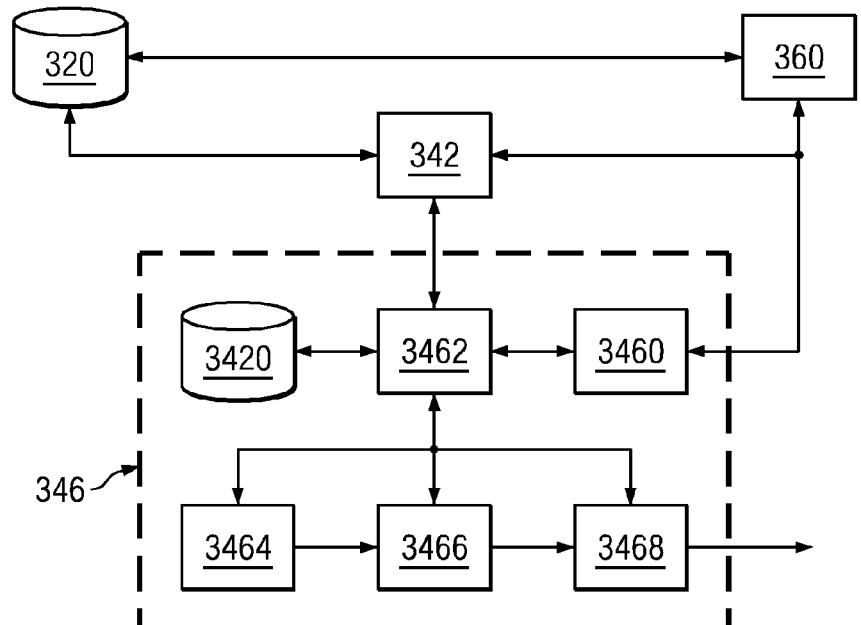

Each of stages 342, 344, 346, and 348 may comprise a plurality of environments. Referring to FIG. 4, testing stage 346 can comprise its own management hub 3462 that is bidirectionally coupled to the higher-level management stage 342, repository 3420, configuration console 3460, and stages 3464, 3466, and 3468. Management hub 3462 may comprise a management stage and management console similar to management hub 342. Although not shown, either or both configuration consoles 3460 and 360 may be bi-directionally coupled to each of the stages and other software components within stage 346. In an alternative embodiment, repository 320 may be coupled to repository 3420, management hub 3462, or both. Note that the basic structure of testing stage 346 is substantially the same as stage 340.

Although three stages 3464, 3466, and 3468 are illustrated under the control of management hub 3462, any number of stages could be used. Each of stages 3464, 3466, and 3468 may have a structure similar to stage 346. More specifically, each of stage 3464, 3466, and 3468 has a management hub (or at least a management stage) and may include any number of stages under that management hub's control and may also include a repository and configuration console. Although not shown, each of those stages can be bi-directionally coupled to configuration console 360. After reading this specification, skilled artisans will appreciate that this basic unit can be replicated any number of times and at many levels.

Figure 5:
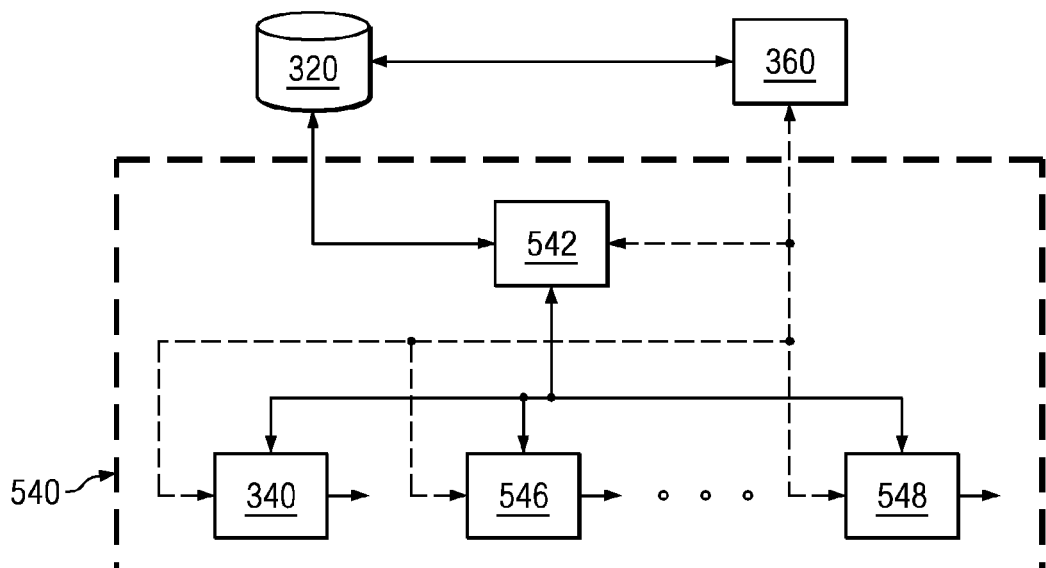

Now that the "basic building block" of a stage has been described with respect to FIGS. 3 and 4, attention is now directed to FIG. 5, which illustrates stage 340 in relationship to high-level systems. The enterprise having stage 340 may be a customer of another enterprise that operates management hub 542. Similar to management hub 342, management hub 542 can include a management stage and a management console.

FIG. 5 illustrates one exemplary architecture. The vendor's stage 540 may be bi-directionally coupled to repository 320 and configuration console 360. The vendor may have nearly any number of customers, which represented by stages 340, 546, and 548 that are bi-directionally coupled to management hub 542 and configuration console 547. Note that from the vendor's perspective, each of stages 340, 546, and 548 may be also be considered production stages.

Repository 545 and configuration console 547 are bi-directionally coupled to management hub 542. Although not shown, either or both configuration consoles 547 and 360 may be bi-directionally coupled to each of the stages and other software components within stage 540. In an alternative embodiment, repository 320 may be coupled to repository 545, and in another embodiment, repository 320 may not be coupled to management hub 542 (i.e., repository 320 can only be accessed, if at all, by set 540 via configuration console 360).

Management hub 542 can control access to the digital asset and potentially automatically control the activities within stages 340, 546, and 548 with respect to the digital asset. Each of stages 340, 546, and 548 can determine what level of control that it is willing to grant management hub 542.

Management hub 542 can perform any of the activities described with respect to management hubs 342 and 3462. Management hubs 342 and 3462 are subordinate to the higher-level management hub 542. More specifically, management hubs 342 and 3462 may have their own business rules and processes used to operate those hubs, but those management hubs 342 and 3462 cannot perform activities that conflict with the business rules and processes of management hub 542. In other words, management hubs 342 and 3642 may have some autonomy to the extent it is not inconsistent with management hub 542.

Using management console at management hub 542, a vendor can define processes and business rules to which the digital assets and their use are to comply in stages 340, 546, and 548. Note that the basic structure of stage 540 is substantially the same as stages 340 and 346. The level of automation may be determined by the enterprise operating management hub 542, at a lower lying stage (340, 546, or 548), or a combination.

In one embodiment, substantially all activities within stage 340, 546, or 548 may be automated and under the control of management hub 542. Configuration consoles 547 and 360 may have information regarding the deployment of the digital asset and configuration of the digital asset or other software components to allow use the digital asset. Such information may be useful to identify potential problems or solutions to issues that may first be seen with customers of the vendor.

On the other end of the spectrum, management hub 542 may only be configured to notify a lower-lever stage that a digital asset is available to a stage and allow manual downloading and configuration to be performed by that stage. In this embodiment, only limited information, if any would be fed back to the configuration consoles 547 and 360.

In another embodiment, the determination of the level of automation at a lower-lying stage is made by the enterprise operating the lower-lying stage. Stage 340, 546, or 548 may elect to manually perform actions rather than allowing for an automated transfer to them. Any or all of downloading the digital asset, performing testing, if any, on the digital asset, deploying the digital asset, and configuring the digital asset or systems on which digital asset runs may be performed manually or under the control of the local management hub at the stage, rather than in conjunction with management hub 542. The method and system can be adapted to track if and when the download occurred and check periodically with the customer at that stage to determine how the digital assets performed. In one embodiment, the periodic checking may be performed using a polling system.

Stage 340, 546, or 548 may originally be configured for manual operation. At a later time, the enterprise the controls stage 340, 546, or 548 may decide to become part of the automated system. Past configuration information from that particular stage may be forwarded to the management hub 542, configuration consoles 547 or 360, repositories 545 or 320, or any combination thereof.

In still another embodiment, some, but not all, activities within a stage 340, 546, or 548 may be under the control of management hub 542. To the extent information is made available to management hub 542 or configuration console 547 or 360, or any combination thereof, data regarding the stage and its relationship to the digital asset (e.g., where the digital asset is deployed, how it is used, and how the digital asset or system using the digital asset is configured within the stage) may be collected and made available outside the stage.

Therefore, each customer at stage 340, 546, or 548 may determine the level of automation (control by management hub 542) at its stage. For automated processing, the digital asset may be received by the management stage (not shown in FIG. 5) within stage 340, 546, or 548 and deployed within or downstream of that stage. Each of stage 340, 546, and 548 can process the digital asset through its stage(s), if any, as controlled by its own management hub and can deploy the digital asset through its production stage or subsystem as required.

Figure 6:
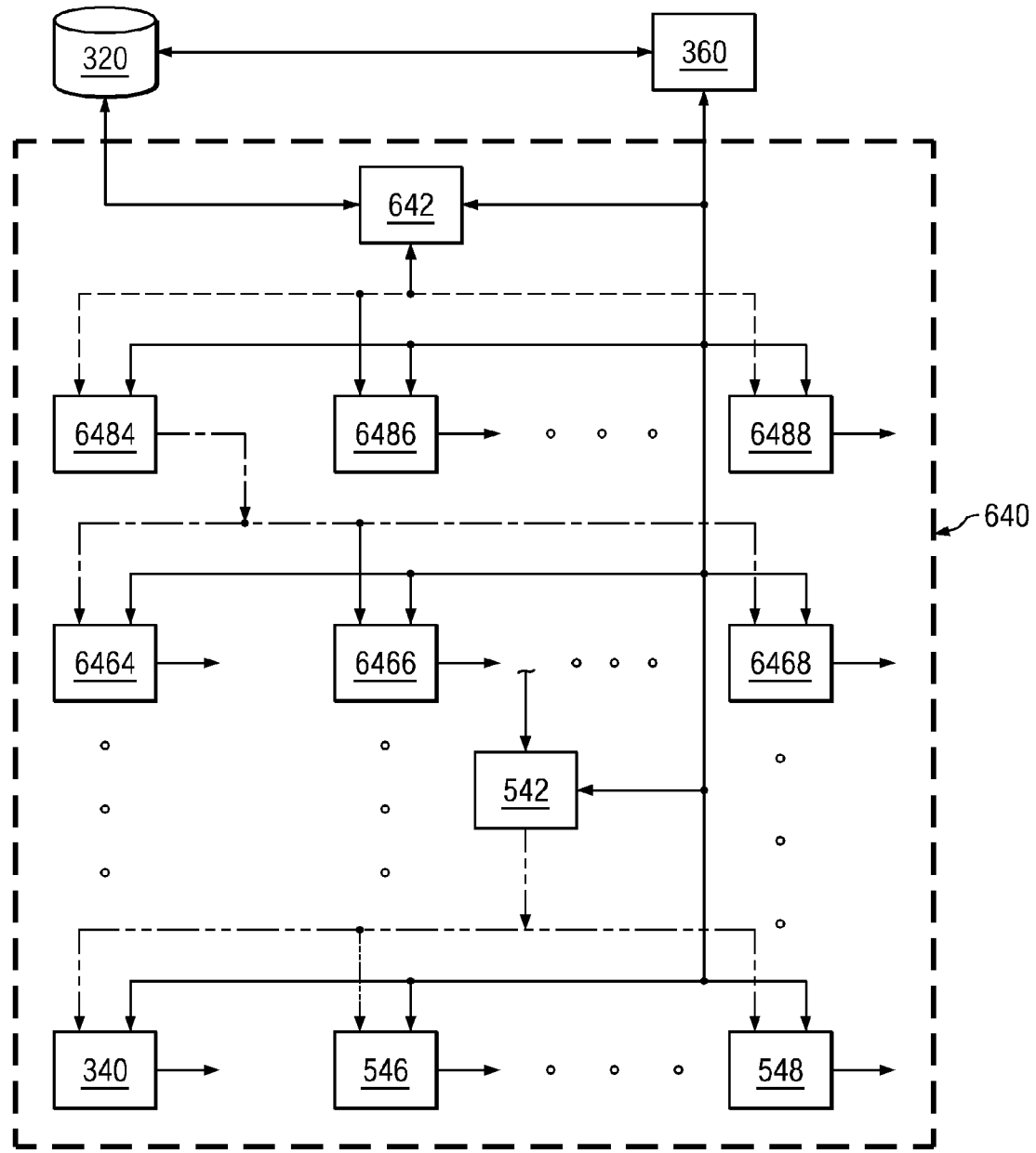

The power and scalability of this architecture may be extended even further upstream as illustrated in FIG. 6. The digital asset may be initially developed by an enterprise that controls and operates stage 640 and management hub 642. FIG. 6 helps to illustrate real world complexities with which large software companies may need to address. Within the large software company, it may have any different internal or external customers with potentially different levels of service to be provided. Due to the number of levels and complexity, the large software company may need to support many different versions of the same digital asset. The method and system can allow the large software company to better control and isolate change in a more manageable way.

Each of the stages (e.g., stage 6484, 6466, 548, etc.) within stage 640 has a basic structure substantially the same as described with respect to stage 340 in FIG. 3. Note that a management hub is not required for every stage, and therefore, each stage may or may not have a management hub. Any number of stages may be under control of the management hub. If the management hub includes a production subsystem, no other stages below a management hub are required. A local repository, local configuration console, or both may be present at any stage. The configuration console 360 and repository 320 may keep track of the digital assets and their metadata at all levels to the extent the lower level stages allow access. The management hub 642 can control the execution and manage the digital asset to the different levels in FIG. 6.

In one embodiment illustrated in FIG. 6, digital assets originating from an enterprise may be managed and deployed by management hub 642 to at least three different first-level (e.g., beta) customers' designated as stages 6484, 6486, and 6488. Other customers may be at this level but are not illustrated in FIG. 6.

A customer may modify, remove, or add stages within their own stage and define business processes and rules within each stage as the customer desires to the extent they are not inconsistent with business processes and rules that may be mandated by management hub 642. The business processes and rules may vary depending on the type of digital assets. For example, if the digital assets are a software application, one set of stages, business processes and rules may be used, and if the digital assets are electronic news articles, a different set of stages, business processes, and rules may be used. Data regarding the first-level customers' configurations and other information regarding their staging may be captured and be accessible to configuration console 360.

Any or all of stages 6484, 6486, and 6488 may include a testing stage to test the digital asset before the digital asset is deployed within a customer's enterprise. The system can be configured to revert back to a prior revision of the digital asset with relative ease. Note that this can hold true for all stages under the within stage 640. After a testing stage is at least partially completed, the customer may have more information before deciding whether to deploy the digital asset within its organization. Metadata captured earlier in the process from this or other stages may be available to the current stage via configuration console 360.

A production stage or subsystem (of a management hub) within stage 6484, 6486, or 6488 can be used to deploy the digital assets further. Referring to stage 6484, it can deploy the digital asset to its customers (second-level customers from the perspective of management hub 642) at stages 6464, 6466, and 6468. The second-level stages 6464, 6466, and 6468 can be bi-directionally coupled to configuration console 360. The digital assets can be provided to any number of levels and may include stages 540, 340, 546, and 548. Similar to the other levels, data regarding the lower-level customers' configurations and other information regarding their staging of the digital assets may be captured and be accessible to configuration console 360.

Each of stages 6484, 6486, 6488, 6464, 6466, 6468, 340, 546, and 548 may be used to distribute the digital assets further as illustrated by the arrows exiting the right-hand side of the respective stages. Alternatively, the distribution may terminate at any one or more of those stages.

In a specific, non-limiting embodiment, the power of the architecture is illustrated with an example where a digital asset may include an update to an application. After the digital asset is developed and tested, it can be deployed under the control of management hub 642. The digital asset can then be automatically received by first-level customer web applications 6484, 6486, and 6488.

Management hubs within stages 6484, 6486, and 6488 can be used to automatically route the digital assets through the stages for each of the first-level customers. As the digital asset is being processed through the stages, metadata regarding the digital assets at the different stages can be captured and made available to configuration console 360.

The management hubs within stages 6484, 6486, and 6488 can control the testing or other operations, if any, within those stages. The tests or other operations may be tailored to the first-level customer's needs and desires by developing business rules and processes to be executed by the management hub.

Previously unknown problems with the digital asset may first be discovered with the first-level customers because they may be using a different type of environment compared to the enterprise that controls management hub 642. As such testing or operations at stages 6484, 6486, or 6488 may uncover problems that a higher-level enterprise may not be able to replicate.

The digital asset, under the control of the management hub within stages 6486, 6486, or 6848, can be automatically moved to the production stage or subsystem within such stage. Referring to stage 6484, its production stage under the control of its management hub can automatically route the digital asset to its own customers at stages 6464, 6466, and 6468. In one embodiment, the second-level customers may represent departments or other divisions within the first-level customer's organization (internal customers) of stage 6484. Alternatively, the first-level customers may be a distributor of the digital asset or may use the digital asset and repackage or bundle that digital asset with another digital asset to be sold to retailers or the general public, which may be the second-level customers.

In another embodiment, an enterprise, that controls or operates stage 642, may have first-level customers represented by stages 6484, 6486, and 6488 and second-level customers at stages 6464, 6466, and 6468. For example, the first-level customers may be preferred or premier customers, and the second-level customers may be the other (not preferred or premier) customers. Instead of stages 6464, 6466, and 6468 receiving a digital asset from stage 6484 as shown in FIG. 6, stages 6464, 6466, and 6468 would be bi-directionally coupled to stage 642 (not shown in FIG. 6). Data regarding customer profiles, state information regarding customer environment, and the like at the second level of customers at stages 6464, 6466, and 6468 can be captured and be accessible from configuration console 360.

The principles of the method and system previously described can be extended to nearly any and all types of digital assets. New word processing, graphics, games, web-related, or other software applications or their updates and revisions may use the architecture described. The present invention is not limited only to its use with software applications. Other digital assets including operation systems, configuration files, image files, or even changing a single bit of information can also use the architecture. Different stages, business processes, and rules may be used.

The system illustrated in FIG. 6 is flexible to cover many different situations. For example, more than one level illustrated in FIG. 6 may reside within a single enterprise that controls and operates management hub 642. In one embodiment, an enterprise that develops content, which can be a set of digital assets, may deploy the content within different departments of its own enterprise before deploying the content outside of the enterprise. Stages 6484, 6486, and 6488 may represent human resources, accounting, and legal departments, respectively, within the enterprise. These departments, which may be internal customers to the enterprise, may have their internal stage(s) (not shown) within stage 6484, 6486, or 6488 to test and work with the digital asset before the enterprise is willing to have its external customers have access to the digital asset. In this manner, problems may be discovered before any of the digital assets are deployed outside the enterprise. The lower levels in FIG. 6 could represent external customers of the enterprise that operate and controls management hub 642. In this embodiment, blocks 6464, 6466, and 6468 may be coupled to management hub 642 rather than stage 6484 as illustrated in FIG. 6.

In still another embodiment, the first level stages 6484, 6486, and 6488 may represent beta testers for the digital assets. The beta testers may represent large customers or strategic partners that may help test and locate problems with the digital assets by themselves or when combined with other hardware and software configurations that the single enterprise cannot replicate. After beta testing is completed, the enterprise may deploy the digital assets. The lower levels at stages 340, 546, 548, etc. could represent the general public to which the digital assets may be deployed after beta testing.

In a further embodiment, a first level outside the enterprise may represent preferred customers. Digital assets may be deployed to preferred customers (e.g., at stages 6484, 6486, 6488, etc.), first. After some time, the digital assets may become generally available and be deployed to other customers at lower level stages (e.g., 340, 546, 548, etc.).

Referring to FIG. 6, configuration console 360 can be bi-directionally coupled to any or all stages within stage 640. In one embodiment, configuration console 360 may be bi-directionally coupled to any or all management stages. In this manner, configuration console 360 can keep track of management systems as digital assets. Configuration console 360 can access information to determine where the digital assets are located and running in which environments. Configuration console 360 can keep track of revisions of digital assets, who have modified them, which units have deployed the digital assets, which units have accepted or rejected the digital assets, and potentially other information. Note that configuration console 360 may change an attribute of a running system. Configuration console 360 can use remote agents to achieve such changes and may work in conjunction with the management hubs.

The use of configuration console 360, a management hub, and a deployment subsystem allows change that can be managed automatically without manual interfacing. After reading this specification, skilled artisans will appreciate that many potential configurations within their own enterprise or outside of the enterprise may be used with the digital assets. The number of units at any level, the number of levels, and to what each level corresponds can be determined by each enterprise as it desires.

Before using the system, it must first be created. This embodiment illustrates some of the issues that may occur when a new application is being created that would otherwise use the method and system previously described. In other words, a new set of web applications may be developed but need to use web applications during development. A bootstrapping method can be used to generate the initial set of web applications.

In creating the initial set of web applications, a configuration server, such as the one that may support configuration console 360, may be used at the starting point for a management hub. The configuration server is effectively a configuration management server, i.e., it is functionally the management hub in the beginning of the process.

If the digital assets include part of a management stage, those digital assets may be managed by a management stage at a higher level, which is the management configuration server. The management configuration server can be coupled to configuration console 360 and manage stages 342, 344, 346, 348 and stages present within the management configuration server itself. The quality assurance stage of the management configuration server can test the new stage 342, 344, 346, and 348 being developed, which are managed by the management configuration server. The enterprise's product distribution can be seen from the configuration console 360. After testing, the IT department can then release the product to a production stage from the perspective of the management configuration server. The configuration console 360 can have an enterprise-wide view of the actual content management system running inside of a management stage. The enterprise-wide view of the digital assets may be from the configuration console at management configuration server.

For subsequent revisions, in order to keep some stability and stability in the system, the management configuration server may use a prior version of web applications compared to management stage 342. In this manner, software can be properly developed for management stage 342 (or any other stage) and tested using a prior generation of the management hub.

Agents have been previously described with respect to deployment, configuration, and potentially other operations. Agents do not need to be dedicated to only one operation. For example, an agent may perform deployment, configuration, or nearly any combination of operations. The method and system can design and use agents that best suit their enterprise and how it prefers to use agents.

The method and system have advantages over conventional methods and systems. The method and system provides a superior way to manage change regarding digital assets including creation, modification, deployment, acceptance or rejection, and potentially other activities. The control of digital assets and the ability to isolate stages from one another allow an enterprise to manage the deployment its products and update the services that are executing without as much manual intervention.

An automated system allows digital assets to be deployed faster because the management hub(s) control the movement of the digital assets, rather than using manual handoffs. The method and system can be configured to deploy digital assets within a customer's enterprise and not wait for a customer to download the digital assets from an enterprise's site.

A customer support department for an enterprise may spend less time solving time-critical emergencies because digital assets are not deployed in an uncontrolled manner. Metadata can be captured, sent to the configuration console 360 and stored within repository 320. Customer support may have access to configuration console 360. In one embodiment, customer support may use the configuration console to access metadata regarding the digital asset and environment(s) in which it is operating at the customer's site. Previously unknown hardware or software incompatibilities may be identified. Also, the enterprise may provide a customer with a solution faster because more information may be available to customer support. The method and system allows an environment such that everyone gets more efficient over time because they are using the same system and method.

Customer or other lower level stages can access the digital assets in an automated or manual manner at the time the customer or stage prefers. The customer can elect to have the enterprise automatically deploy the digital asset or may devise its own automated methods for deployment at the customer's site. The management hub at the customer can include business processes and rule, so that the digital asset can analyzed under the customer's own quality control tests. In this manner, the digital asset may be tested by the customer in an isolated environment before the customer launches the update throughout its organization. In this manner, the customer is better able to manage change caused by the enterprise's update. The enterprise may focus its support resources, the support resources on the people that did not accept digital assets by automation.

Also, the method and system can be configured to allow a stage to revert to a prior revision of the digital asset or configuration, if problems are discovered that are not easily solved. The reversion is relatively easy because prior revision and configuration data is stored in repository 320, which can be accessed through the configuration console 360 (or alternatively, using a local repository/local configuration console combination). The ability to revert to a prior version reduces risk at a lower lying stage and may increase the likelihood that the lower lying stage will use the automated method and system.

Compare this method to those conventionally used by some companies. With a conventional method, a user must decide whether to download an update before being given an opportunity to test it. If the update does not work, a customer may have to reinstall the product without the update, which may be difficult both from a time and location (trying to find a copy of the prior version of the product) perspective. The conventional "all or nothing" proposition without the ability to test is very risky to the customer.

Additionally, the method and system can be used to determine who is actually using the digital asset. The method and system effectively can be used to "audit" with respect to licensing and can be used to decommission the digital asset for licensing or other purposes.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method of managing a digital asset in a client-server network, comprising:
    deploying the digital asset from a management stage computer to a quality assurance stage computer in the client-server network, wherein the digital asset remains under control of the management stage computer after deployment;
    automatically testing the digital asset deployed to the quality assurance stage computer within isolated environment of one or more machines;
    deploying the digital asset to one or more production stage computers in the client-server network;
    automatically preparing the digital asset into one or more products by the one or more production stage computers in the client-server network; and
    sending the one or more products containing the digital asset to one or more customer computers coupled to the client-server network.

2. The method according to claim 1, further comprising:
    receiving the digital asset at the management stage computer from a vendor computer coupled to the client-server network.

3. The method according to claim 1, further comprising:
receiving the digital asset at the management stage computer from a development stage computer in the client-server network.

4. The method according to claim 1, further comprising:
deploying the digital asset from a development stage computer to the quality assurance stage computer using a remote agent under control of the management stage computer.

5. The method according to claim 1, further comprising:
deploying the digital asset from the quality assurance stage computer to the one or more production stage computers using a remote agent under control of the management stage computer.

6. The method according to claim 1, further comprising:
capturing metadata during the testing step;
sending the metadata to the management stage computer; and
storing the metadata in a repository coupled to the management stage computer.

7. The method according to claim 1, wherein the digital asset is an instantiation of a defined content type, a management system, a database, a file containing unstructured content, a file containing structured content, an integration source, a content repository, an aggregation source, a text file, an image file, or an Extensible Markup Language document.

8. A computer readable storage medium storing computer instructions translatable by one or more processors to perform:
deploying the digital asset from a management stage computer to a quality assurance stage computer in the client-server network, wherein the digital asset remains under control of the management stage computer after deployment;
automatically testing the digital asset deployed to the quality assurance stage computer within isolated environment of one or more machines;
deploying the digital asset to one or more production stage computers in the client-server network;
automatically preparing the digital asset into one or more products by the one or more production stage computers in the client-server network; and
sending the one or more products containing the digital asset to one or more customer computers coupled to the client-server network.

9. The computer readable storage medium of claim 8, wherein the computer instructions are further translatable by the one or more processors to implement a remote agent of the management stage computer for deploying the digital asset from a development stage computer to the quality assurance stage computer.

10. The computer readable storage medium of claim 8, wherein the computer instructions are further translatable by the one or more processors to implement a remote agent of the management stage computer for deploying the digital asset from the quality assurance stage computer to the one or more production stage computers.

11. The computer readable storage medium of claim 8, wherein the computer instructions are further translatable by the one or more processors to perform:
capturing metadata during the testing step;
sending the metadata to the management stage computer; and
storing the metadata in a repository coupled to the management stage computer.

12. A system for managing a digital asset in a client-server network, comprising:
one or more processors; and
one or more computer readable storage media storing computer instructions translatable by the one or more processors to perform:
deploying the digital asset from a first stage to a second stage after the digital asset is developed or received, wherein the first stage and the second stage are within the client-server network;
automatically testing the digital asset on one or more machines;
deploying the digital asset to one or more production stages in the client-server network;
automatically preparing the digital asset into one or more products; and
sending the one or more products containing the digital asset to one or more customer computers coupled to the client-server network.

13. The system of claim 12, further comprising:
a repository coupled to the first stage for storing metadata captured during testing the digital asset on one or more machines.

14. The system of claim 12, further comprising:
a configuration console coupled to the repository and to the first stage.

15. The system of claim 12, wherein the first stage further comprises:
a local repository;
a local configuration console;
a management hub coupled to the local repository and the local configuration console;
a testing stage coupled to the management hub; and
a production stage coupled to the management hub.

16. The system of claim 15, wherein the first stage further comprises:
a development stage bi-directionally coupled to the management hub and uni-directionally coupled to the testing stage, wherein the testing stage is uni-directionally coupled to the production stage.

17. The system of claim 16, wherein the management hub further comprises:
one or more remote agents for controlling the digital asset as deployed from the development stage to the testing stage and from the testing stage to the production stage.

18. The system of claim 15, wherein the management hub further comprises:
a management stage; and
a management console coupled to the management stage, wherein business rules to which the management stage is to comply are provided by a user via the management console.

19. The system of claim 18, wherein the testing stage further comprises:
a testing stage management hub coupled to the management stage of the management hub of the first stage;
a testing stage repository coupled to the testing stage management hub;
a testing stage configuration console coupled to the testing stage management hub; and
one or more stages coupled to the testing stage management hub.

20. The system of claim 19, wherein the testing stage management hub further comprises:
a local management stage; and
a local management console coupled to the local management stage.

21. The system of claim 12, further comprises:
a vendor management hub coupled to the first stage.

22. The system of claim 21, wherein the vendor management hub comprises:
- a vendor management stage; and
- a vendor management console coupled to the vendor management stage.

23. The system of claim 22, wherein processes and business rules to which the digital asset and use of the digital asset are to comply in the first stage are provided by a user via the vendor management console.

* * * * *